Feb. 20, 1968  R. R. BALAGUER  3,370,298

DRY CELL BATTERY OF FLAT CONFIGURATION

Filed June 2, 1965

United States Patent Office 3,370,298
Patented Feb. 20, 1968

3,370,298
DRY CELL BATTERY OF FLAT CONFIGURATION
Rodolfo Rodriguez Balaguer, Fort Lauderdale, Fla., assignor, by mesne assignments, to Patent Holdings Corporation, Fort Lauderdale, Fla., a corporation of Florida
Filed June 2, 1965, Ser. No. 460,635
12 Claims. (Cl. 136—100)

The present invention relates to dry cell battery constructions and more particularly to such constructions which are flat in configuration and suitable for stacking in multiple cell arrangements.

For a number of purposes it has been desirable to have a dry cell battery of flat configuration, i.e., a cell whose overall length is small as compared with conventional cells of like capacity. The principal object of the invention has been the provision of such a dry cell battery.

Another object of the invention has been the provision of such a dry cell battery which is especially adapted for stacking in multicell arrangements.

A further object of the invention has been the provision of a magnesium battery of flat configuration.

Still another object of the invention has been the provision of such a battery which exhibits a high degree of resistance to electrolyte leakage even when stored or used under tropical climatic conditions.

A further object of the invention has been the provision of such a battery which affords a high degree of resistance to shock and vibration.

Another object of the invention has been the provision of such a battery which is economical to manufacture.

Other and further objects, features and advantages of the invention will appear more fully from the following description taken in connection with the appended drawing, in which.

Figure 1:
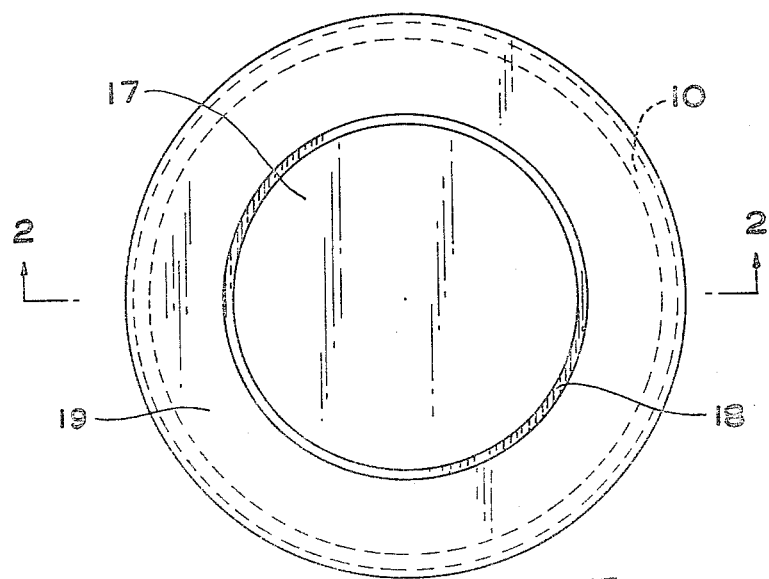
FIG. 1 is a top plan view of one form of dry cell battery construction embodying the invention.
Figure 2:
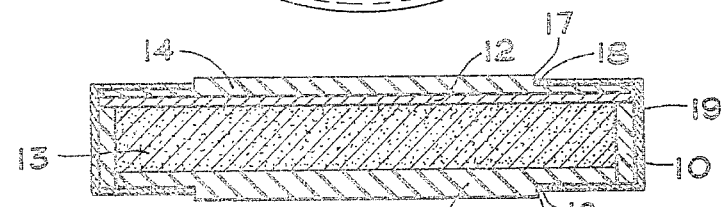
FIG. 2 is a cross-sectional view taken along the line 2—2 of FIGURE 1.

Referring now to the drawing and more particularly to FIGS. 1 and 2, the dry cell battery of the invention comprises a hollow, shallow, electrically insulating, open-ended cylinder 10 closed at one end by a circular green carbon disc 11 and at the other end by a circular metal disc 12. The green carbon disc 11 fits within the cylinder 10 and the edge of the disc 11 is preferably permanently bonded to the inner surface of the cylinder 10 at one end of the latter, as by molding the disc 11 in place within the cylinder 10. The metal disc 12 rests on the other end of cylinder 10 and preferably has a diameter equal to the outer diameter of the cylinder 10.

The cylinder 10 may be made of any suitable plastic material which is electrically insulating and which is resistant to attack by the chemicals, e.g., electrolyte, used in the battery construction. For example the cylinder 10 may be made of molded fiberglass, particularly when substantial strength and impact resistance are desired. Many other plastic materials may be used, e.g., Teflon (a tetrafluoroethylene polymer) or one of the acrylic resins such as Plexiglas (methyl methacrylate).

The green carbon disc 11 serves as the battery cathode or positive electrode and should be made from a molded green carbon which (1) is highly electrically conductive, (2) bonds satisfactorily to metals, (3) is mechanically strong, (4) is homogeneous and (5) is impervious to the passage of liquids and impervious or largely impervious to the passage of gases generated during battery discharge. The green carbon and the general method of molding the same may be as described in Rodolfo Rodriquez Balaguer United States Patent 2,903,499, issued Sept. 8, 1959. A preferred carbon molding composition and method of producing the same are described and claimed in Rodolfo Rodriquez Balaguer United States patent application Ser. No. 208,096 filed July 6, 1962.

The metal disc 12 serves as the battery anode or negative electrode and should be made of the metal selected for the battery electro-chemical system. Preferably the disc 12 is made of magnesium or one of the magnesium alloys used for battery electrodes. Other metals can be used, e.g., zinc as in the conventional zinc cell. The under surface of anode disc 12 should be provided with a bibulous coating to prevent direct contact between battery mix and the metal surface, as is well-known in the art. Kraft paper or any of the well-known bibulous materials may be used for this purpose.

The space within cylinder 10 between anode disc 12 and cathode disc 11 is filled with battery mix 13. By the term "battery mix" is meant the depolarizing agent, electrolyte and any other chemicals which may be included in a primary battery consistently with the selected electro-chemical system. The depolarizing agent may be any of the manganese dioxide materials generally found suitable for this purpose, e.g., type M manganese dioxide. A typical battery mix for a magnesium cell might consist of 88% (by weight) type M manganese dioxide (synthetic) chemical one and 1% $Mg(OH)_2$, 3% $BaCrO_4$, 8% acetylene black wet 550 ml./1000 g. with 250 g./l. $MgBr_2$ and 0.25 g./l. $Na_2CrO_4$.

In the case of a magnesium cell the entire space within cylinder 10 may be filled with the battery mix 13. In the case of a zinc cell it is desirable to leave a small space for reception of liquid exuded upon discharge of the cell.

A circular green carbon disc 14 is provided in direct contact with the upper surface of anode disc 12. The disc 14 preferably has a diameter equal to the outside diameter of cylinder 10. The disc 14 is preferably made from the same material and in the same way as cathode disc 11. The discs 11 and 14 may be identical. However, disc 14 may be thinner than disc 11, as shown. Disc 14 is preferably bonded to anode disc 12 at the time disc 14 is molded. Such bonding can readily be achieved by molding the green carbon by simultaneous application of pressure and electrical current, as described in the aforementioned Balaguer patent. Such bonding assures a corrosion-free contact free from creepage of electrolyte.

Cathode disc 11 has a centrally located, outwardly extending circular flange 15 which affords an annular shoulder 16 between flange 15 and the outer periphery of cathode disc 11. Disc 14 is provided with a similar centrally located, outwardly extending circular flange 17 which affords an annular shoulder 18 between flange 17 and the outer periphery of disc 14.

Sealing of the cell is effected by means of a moisture-proof, electrically insulating tape wrapping 19 which is wrapped around the outside of cylinder 10 and is folded over to overlie annular shoulders 16 and 18. The wrapping 19 may conveniently be made from one or more layers of a fiberglass thread reinforced plastic tape, e.g., the one sold under the trademark Permacel by Permacel Tape Corp., of New Brunswick, N.J., or one of the strong, moisture-proof masking or sealing tapes available commercially. Instead of an actual tape, the wrapping 19 may be a fiberglass fabric wrapped and folded and then impregnated with resin as in ordinary fiberglass molding techniques.

The wrapping 19 serves to provide axial and radial strength to retain the battery elements assembled as shown and to resist any swelling action as the cell discharges. A tape or molded fiberglass wrapping, as described, will largely prevent the loss of moisture from the cell but will permit venting of hydrogen generated during cell discharge. In this regard, the seal effected by wrapping 19 along the annular shoulders 16 and 18 and between the outer peripheries of cylinder 10 and discs 12 and 14 will prevent loss of liquid but will relatively readily permit passage of hydrogen gas. If desired, additional sealing washers (not shown) may be provided on the annular shoulders 16 and 18.

Cell dimensions used can, of course, be varied widely to accommodate desired service and performance requirements. By way of example, the cell of FIGS. 1 and 2 might have an outer diameter of about one inch and a length (from the outer surface of flange 15 to the outer surface of flange 17) of 7/64 inch. The cell length (height) may be varied, but any substantial increase of the spacing between the anode and cathode electrodes will result in an increase in cell internal resistance and hence in decreased closed circuit voltage. The cell diameter may be increased as needed to afford a larger volume of mix and hence greater battery capacity. It is desirable that the anode thickness be selected so as to be substantially completely corroded when the quantity of battery mix used is exhausted.

When cells of the type shown in FIGS. 1 and 2 are to be stacked for series connection, the green carbon discs 11 and 14 afford good electrical contact from cell to cell. A major advantage of the carbon to carbon contact between adjacent superposed cells is that the contact is corrosion proof. In multicell structures the upper carbon disc of the top cell and the lower carbon disc of the bottom cell may have metallic contact elements bonded to the corresponding carbon discs to afford convenient external contacts. Such metallic contact elements may also be bonded to both carbon discs of a cell intended to be used singly as an individual cell. Such metallic contact elements will also be desirable for effecting parallel connection between cells. It is desirable that the metallic contact element be bonded to the corresponding carbon discs at the time the discs are molded.

Figure 3:
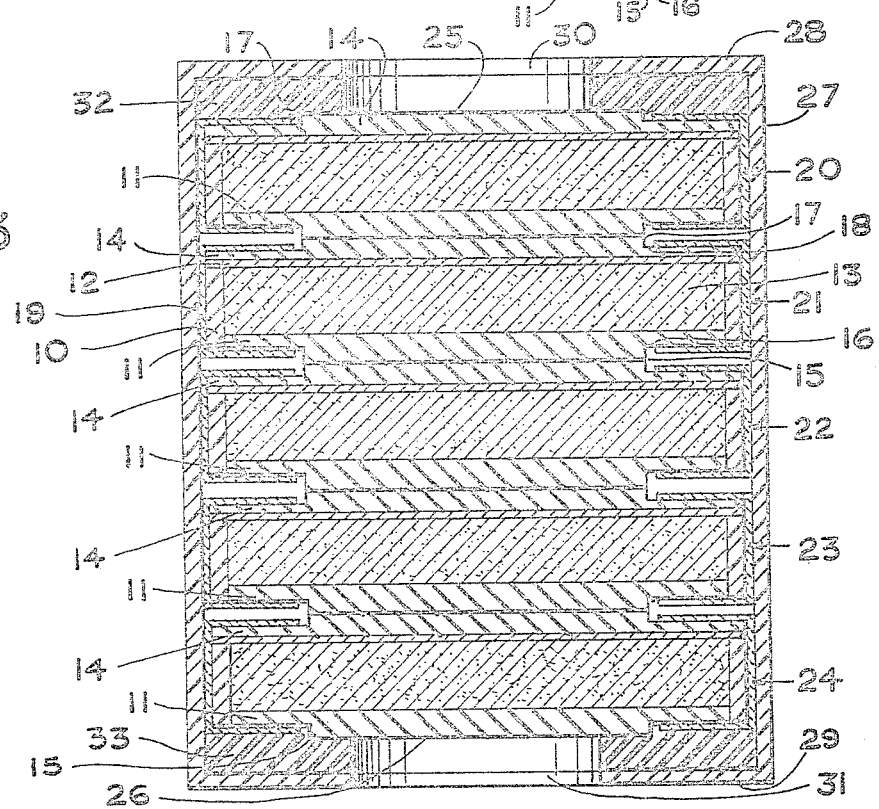
FIG. 3 is a longitudinal sectional view of a stacked arrangement of a number of individual cells of the type shown in FIGS. 1 and 2.

In FIG. 3 there are shown five superposed cells 20, 21, 22, 23 and 24, each of which may be identical to the cell shown in FIGS. 1 and 2. A metal contact element 25 is bonded to the flange 17 of disc 14 of top cell 20 to serve as the composite battery negative terminal. A metal contact element 26 is bonded to the flange 15 of disc 11 of the bottom cell 24 to serve as the composite battery positive terminal. The cells 20–24 are positioned so as to be poled alike to afford a series connection, cell-to-cell connection being achieved by contact of the outer carbon surfaces of adjacent ones of flanges 15 and 17.

The cells 20–24 are stacked within a hollow cylinder 27 which is partially closed at the top and bottom by radially extending annular flanges 28 and 29, respectively. Central circular apertures 30 and 31 are provided in flanges 28 and 29, respectively, to afford access to the contact elements 25 and 26, respectively.

An annular washer 32 of elastic material, e.g., rubber, overlies top cell 20 and a similar annular washer 33 underlies bottom cell 24. The washers 32 and 33 are preferably compressed between the top and bottom of the stack of cells and the flanges 28 and 29, respectively, to maintain close physical and electrical contact between the cells. The inner diameters of the washers 32 and 33 may be the same as the diameters of apertures 30 and 31, respectively.

The cylinder 27 is preferably made from an epoxy resin reinforced fiberglass to provide a strong, lightweight, corrosion-proof container. Such a container will also permit venting of hydrogen gas evolved by the cells during discharge. The cylindrical wall and one of the end flanges 28 and 29 of cylinder 27 may be pre-molded and the other one of the end flanges may be closed and resin impregnated after the cells have been stacked in place.

The cell of the invention has been illustrated in circular shape. Other shapes, e.g., square or rectangular could be used.

While the invention has been described in connection with specific embodiments thereof and in specific uses, various modifications thereof will occur to those skilled in the art without departing from the spirit and scope of the invention as set forth in the appended claims.

What is claimed is:

1. A dry cell battery, comprising a hollow container made of electrically insulating material, a first electrically conductive, green carbon member contacting said container at one end thereof and serving as a closure for said one end of said container, a metallic member contacting the other end of said container and serving as a closure for said other end of said container, a second electrically conductive, green carbon member overlying said metallic member and being in electrical and physical contact therewith, battery mix substantially filling the space in said container between the inner surfaces of said first green carbon member and said metallic member, a bibulous covering on the inner surface of said metal disc preventing direct contact between said mix and said metal, said first green carbon member and said metallic member serving as cathode and anode electrodes, respectively, for said cell, and means to retain said members and said container assembled.

2. A dry cell battery, comprising a hollow container made of electrically insulating plastic material, a first electrically conductive, circular green carbon disc contacting said container at one end thereof and serving as a closure for said one end of said container, a metal disc contacting the other end of said container and serving as a closure for said other end of said container, a second electrically conductive green carbon disc overlying said metal disc and being bonded thereto, battery mix substantially filling the space in said container between the inner surfaces of said first green carbon disc and said metal disc, a bibulous covering on the inner surface of said metal disc preventing direct contact between said mix and said metal, said first green carbon disc and said metal disc serving as cathode and anode electrodes, respectively for said cell, and means contacting the outer periphery of said container and the outer surfaces of said green carbon discs to retain said discs and said container assembled and to resist axial and radially outward expansion forces in said cell, said first and second green carbon discs serving as the cell positive and negative terminals, respectively.

3. A dry cell battery, comprising a hollow cylinder made of electrically insulating plastic material, a first electrically conductive, circular green carbon disc fitting within said cylinder at one end thereof and serving as a closure for said one end of said cylinder, a circular metal disc mounted on the other end of said cylinder and serving as a closure for said other end of said cylinder, a second electrically conductive circular green carbon disc overlying said metal disc and being bonded thereto, battery mix substantially filling the space in said cylinder between the inner surfaces of said first green carbon disc and said metal disc, a bibulous covering on the inner surface of said metal disc preventing direct contact between said mix and said metal, said first green carbon disc and said metal disc serving as cathode and anode electrodes, respectively, for said cell, each of said green carbon discs having an outwardly extending, centrally located flange affording an annular shoulder on the outer surface of each of said green carbon discs between the flange and the outer periphery of each of said green carbon discs, and substantially inelastic means contacting and substantially covering the outer periphery of said cylinder and said annular shoulders to retain said discs and said cylinder assembled and to resist axial and radially outward expansion forces in said cell, said first and second green carbon discs serving as the cell positive and negative terminals, respectively.

4. A dry cell battery, comprising a hollow cylinder made of electrically insulating plastic material, a first electrically conductive, circular green carbon disc fitting within said cylinder at one end thereof and serving as a closure for said one end of said cylinder, the periphery of said first green carbon disc being bonded to the inner surface of said cylinder to provide a liquid-tight seal at said one end of said cylinder, a circular magnesium metal disc mounted on the other end of said cylinder and serving as a closure for said other end of said cylinder, a second electrically conductive circular green carbon disc overlying said metal disc and being bonded thereto, said metal disc and said second green carbon disc each having a diameter substantially equal to the outside diameter of said cylinder, battery mix substantially filling the space in said cylinder between the inner surfaces of said first green carbon disc and said metal disc, a bibulous covering on the inner surface of said metal disc preventing direct contact between said mix and said metal, said first green carbon disc and said metal disc serving as cathode and anode electrodes, respectively, for said cell, each of said green carbon discs having an outwardly extending, centrally located flange affording an annular shoulder on the outer surface of each of said green carbon discs between the flange and the outer periphery of each of said green carbon discs, and substantially inelastic means contacting and substantially covering the outer periphery of said cylinder and said annular shoulders to retain said discs and said cylinder assembled and to resist axial an radially outward expansion forces in said cell, said first and second green carbon discs serving as the cell positive and negative terminals, respectively.

5. A dry cell battery as set forth in claim 4 in which said substantially inelastic means is a fiberglass thread reinforced plastic tape.

6. A dry cell battery as set forth in claim 4 in which said substantially inelastic means is a flexible tape having an adhesive coating on one surface.

7. A dry cell battery as set forth in claim 4 having a metal contact element bonded to one of said flanges.

8. A dry cell battery assembly; comprising a plurality of shallow dry cell batteries stacked one upon another in superposed relation; each of said dry cell batteries comprising a hollow cylinder made of electrically insulating plastic material, a first electrically conductive circular green carbon disc fitting within said cylinder at one end thereof and serving as a closure for said one end of said cylinder, the periphery of said first green carbon disc being bonded to the inner surface of said cylinder to provide a liquid-tight seal at said one end of said cylinder, a circular magnesium metal disc mounted on the other end of said cylinder and serving as a closure for said other end of said cylinder, a second electrically conductive circular green carbon disc overlying said metal disc and being bonded thereto, said metal disc and said second green carbon disc each having a diameter substantially equal to the outside diameter of said cylinder, battery mix substantially filling the space in said cylinder between the inner surfaces of said first green carbon disc and said metal disc, a bibulous covering on the inner surface of said metal disc preventing direct contact between said mix and said metal, said first green carbon disc and said metal disc serving as cathode and anode electrodes, respectively, for said cell, each of said green carbon discs having an outwardly extending, centrally located flange affording an annular shoulder on the outer surface of each of said green carbon discs between the flange and the outer periphery of each of said green carbon discs, and substantially inelastic means contacting and substantially covering the outer periphery of said cylinder and said annular shoulders to retain said discs and said cylinder assembled and to resist axial and radially outward expansion forces in said cell, said first and second green carbon discs serving as the cell positive and negative terminals, respectively; said dry cell batteries being arranged so that one of the green carbon discs of an overlying cell contacts a green carbon disc of the underlying cell; and means to retain said dry cell batteries in said superposed relationship.

9. A dry cell battery assembly as set forth in claim 8 in which the uppermost and lowermost green carbon discs of said assembly each has a metallic contact element bonded to the corresponding flange.

10. A dry cell battery assembly as set forth in claim 9 in which said batteries are poled for series electrical connection.

11. A dry cell battery assembly as set forth in claim 10, comprising a hollow container, said superposed dry cell batteries being mounted in said container, and resilient means for retaining said batteries in superposed position and with adjacent batteries in electrical contact.

12. A dry cell battery assembly as set forth in claim 11, in which said container is a molded fiberglass tube and in which said resilient means comprises a pair of elastic electrically insulating washers located, respectively, above and below the stack of superposed batteries.

References Cited

UNITED STATES PATENTS

| | | | |
|---|---|---|---|
| 2,848,526 | 8/1958 | Franquemont | 136—111 |
| 2,820,081 | 1/1958 | Daley et al. | 136—111 |
| 2,774,806 | 12/1956 | Jobe et al. | 136—111 |

ALLEN B. CURTIS, *Primary Examiner.*

A. SKAPARS, *Assistant Examiner.*

UNITED STATES PATENT OFFICE
CERTIFICATE OF CORRECTION

Patent No. 3,370,298                      February 20, 1968

Rodolfo Rodriguez Balaguer

It is hereby certified that error appears in the above numbered patent requiring correction and that the said Letters Patent should read as corrected below.

In the heading to the printed specification, line 4, for "Holdings" read -- Holding --; column 2, line 28, for "one" read -- ore --; column 3, line 74, for "rectangular" read -- rectangular, --; column 5, line 26, for "an" read -- and --.

Signed and sealed this 22nd day of April 1969.

(SEAL)
Attest:

Edward M. Fletcher, Jr.                      EDWARD J. BRENNER
Attesting Officer                            Commissioner of Patents